(No Model.) 3 Sheets—Sheet 1.

H. M. CRIPPEN.
VEHICLE BRAKE.

No. 290,543. Patented Dec. 18, 1883.

Witnesses:
J. Walter Fowler
H. B. Applewhaite

Inventor:
Henry M. Crippen
per atty
A. H. Evans & Co.

(No Model.) 3 Sheets—Sheet 2.

H. M. CRIPPEN.
VEHICLE BRAKE.

No. 290,543. Patented Dec. 18, 1883.

Witnesses:
T. Walter Fowler
H. B. Applewhaite

Inventor:
Henry M. Crippen
per atty.
A. H. Evans & Co.

(No Model.) H. M. CRIPPEN. 3 Sheets—Sheet 3.
VEHICLE BRAKE.

No. 290,543. Patented Dec. 18, 1883.

Witnesses;
J. Walter Fowler
H. B. Applewhaite

Inventor;
Henry M. Crippen
per Atty.
A. H. Evans & Co.

UNITED STATES PATENT OFFICE.

HENRY M. CRIPPEN, OF BIG RUN, OHIO, ASSIGNOR OF ONE-HALF TO JOHN M. CRIPPEN, OF SAME PLACE.

VEHICLE-BRAKE.

SPECIFICATION forming part of Letters Patent No. 290,543, dated December 18, 1883.

Application filed October 17, 1883. (No model.)

*To all whom it may concern:*

Be it known that I, HENRY M. CRIPPEN, a citizen of the United States, residing in Big Run, Athens county, Ohio, have invented a new and useful Improvement in Vehicle-Brakes, of which the following is a full, clear, and exact description, reference being had to the accompanying drawings, making a part of this specification, in which—

Figure 1:
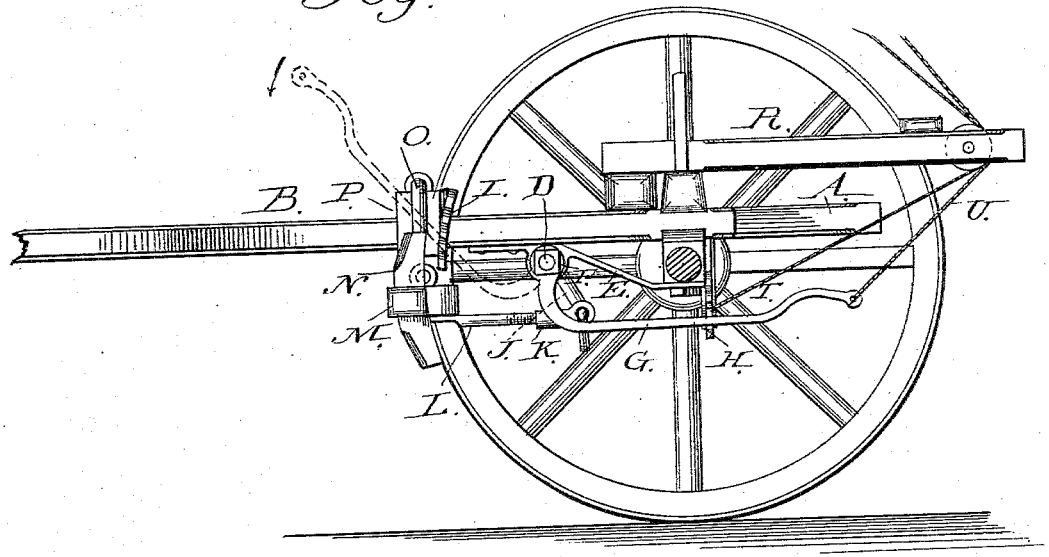
Figure 2:
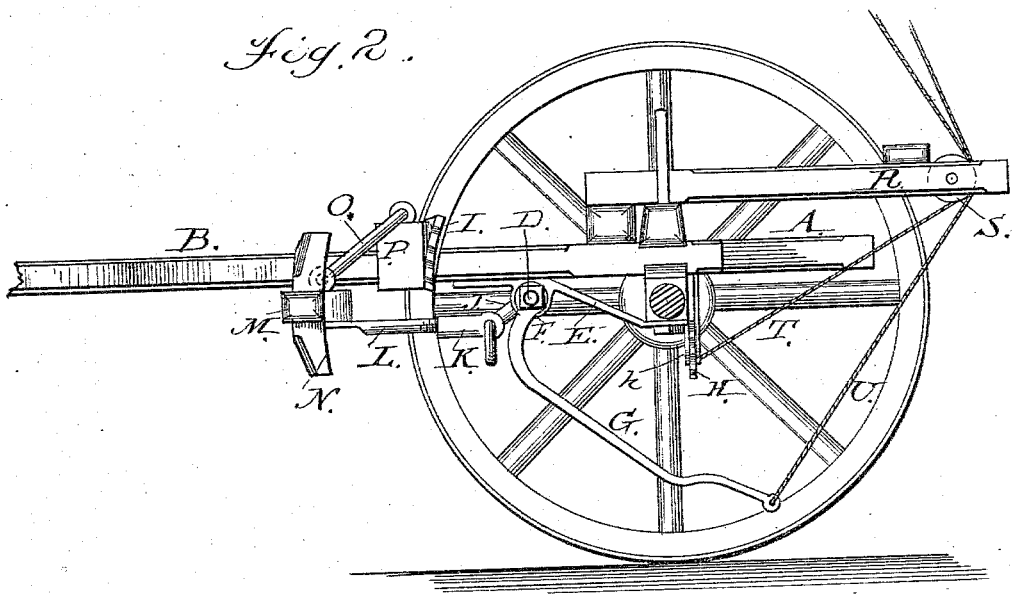
Figure 3:
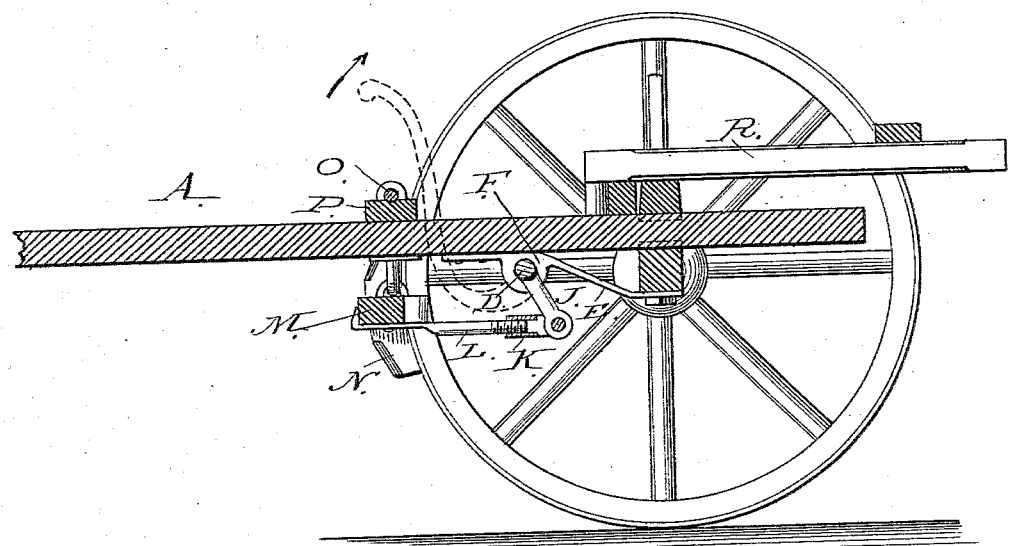
Figure 4:
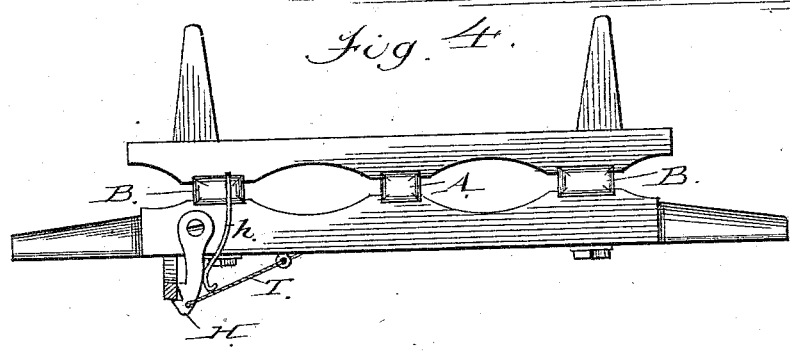
Figure 7:
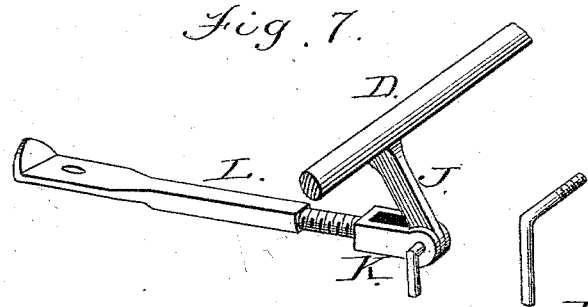
Figure 5:
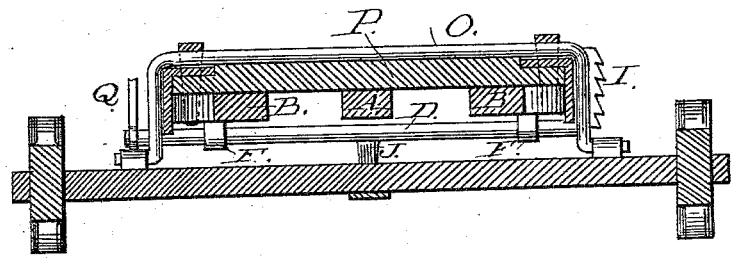
Figure 6:
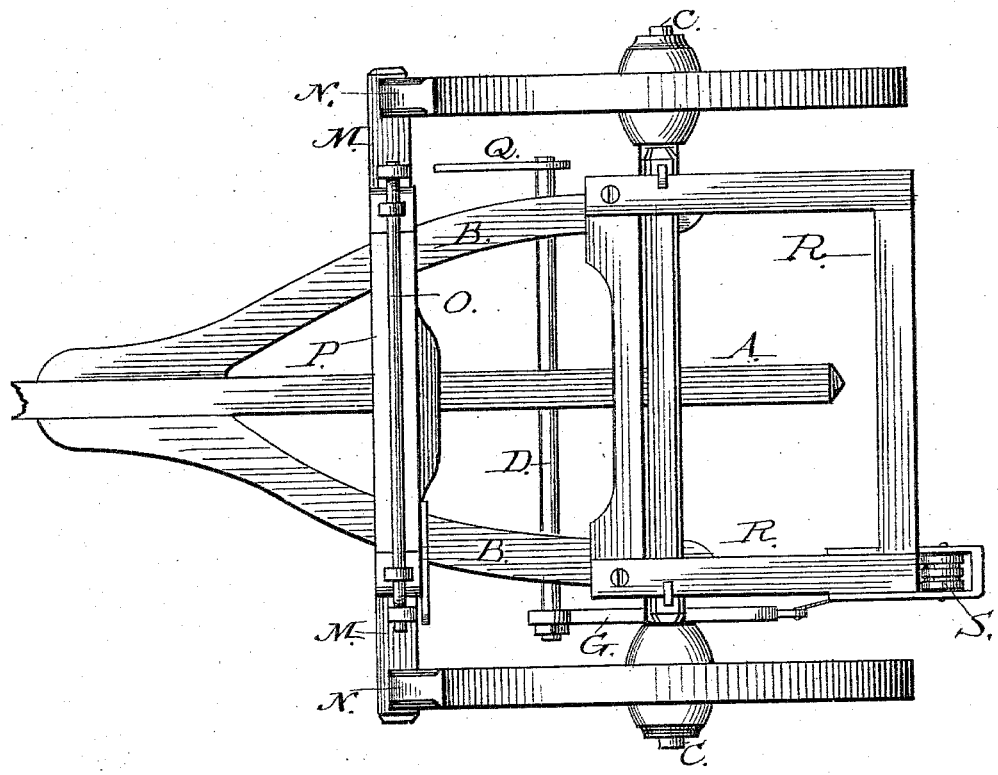

Figure 1 is a side elevation of a portion of the running-gear of a vehicle with my improvements attached. Fig. 2 is the same with a locking device released. Fig. 3 is a longitudinal section. Fig. 4 is a rear view of the axle. Fig. 5 is a transverse section, and Fig. is a plan view. Fig. 7 shows details to be referred to.

My invention has for its object a convenient and efficient means of locking the wheels of the vehicle by producing a steady and equal friction on both wheels and equalizing the friction when one rubber may be more worn than the other, or even when one rubber may be entirely lost or displaced; and it consists of the combinations of devices hereinafter described and explained.

In order to enable others skilled in the art to make and use my invention, I will proceed to describe the exact manner in which I have carried it out.

In the drawings, A represents a coupling-pole, B the hounds, and C the axle, of an ordinary running-gear of a vehicle.

Beneath the hounds and attached thereto I secure the roller-bar D by means of the braces E, secured to the hounds and the axles, and provided with eyes F, which furnish bearings for the roller-bar D.

On one end of the roller-bar I attach the lever-arm G, as shown in Figs. 1 and 2, the free end of which engages with ratchet-bar H on the axle when the wheels are to be locked from the rear. This lever-arm may be secured in reversed position, so as to engage with ratchet I when the lever is operated from the front, as shown in the dotted lines in Fig. 1.

From the center of the roller-bar D descends an arm, J, provided at the lower end with an eye, to which is pivoted a bifurcated socket, K, into which screws the bar L, connected at its forward end to the rubber-bar M by any suitable means. The object of the screw on the bar L is to allow of adjustment of the bar, so as to regulate the distance between the draw-bar and the arm J, thus adjusting the throw to be given to the roller-bar D, and thereby regulating the pressure on the rubbers against the wheels.

Another important object gained by having a joint in the draw-bar is that the position of the lever upon the ratchet can be adjusted to compensate for the wear upon the rubbers. The swinging rubber-bar M, provided with rubbers N, is suspended beneath the hounds by means of the equalizing-bar O and on a line with the face of the rubbers, which prevents twisting or shaking of the same when in use. This equalizing-bar is secured to the cross-bar P, as shown in Fig. 5, by means of eye-bolts or other well-known devices which will allow the draw-bar to swing freely on the equalizing-bar, as the roller-bar D may be operated by the lever-arm G. The cross-bar P, which is rigidly secured to the hounds, carries at one end the ratchet I, before mentioned. It is evident from this construction that as the lever-arm G is thrown back and upward the roller-bar D is revolved in its bearings and the arm J carried to the rearward, drawing after it the rubber-bar M, carrying the rubbers N with equal pressure on the wheels. It is also evident from this construction that if one of the rubbers becomes more worn than the other, or even gets lost or displaced, after one rubber has come in contact with and locked the wheel, the continued pressure upon the rubber-bar, occasioned by the lever-arm on the roller-bar, will cause the equalizing-bar to spring sufficiently from a parallel line to cause the defective rubber, or, in the absence of the rubber, the end of the bar itself, to come in contact with and lock the other wheel, thus equalizing the pressure upon and locking both wheels.

While I have shown the equalizing-bar O as passing along the top of the cross-bar P, it is evident that it may pass beneath the cross-bar without departing from the spirit of my invention, and be of various shapes to receive eyes to secure the same.

On the end of the roller-bar D opposite to the lever-arm G, I place the lever-arm Q, which can be easily operated by the driver when the wagon-bed is in use, as in ordinary cases, (when lever-arm G is removed.)

The frame R represents the rear end of a hay-ladder provided with a double-grooved pulley, S, for the passage of the cords T and U, by means of which a party riding on the top of a load of hay is enabled to lock and unlock the wagon. The ratchet H being forced outward by means of the spring $h$, bearing against its rear, it is evident when the cord T is pulled the lever-arm G is forced up and caught in the ratchet H, and when the cord N is pulled the ratchet is forced back and the locking device is released.

I am aware of the patent to L. J. Fitzgerald, August 28, 1877, No. 194,515, and do not desire to claim, broadly, any feature therein shown.

Having thus described my invention, what I claim as new, and desire to secure by Letters Patent, is—

1. The equalizing-bar O and rubber-bar M, in combination with the roller-bar D, provided with the arm J, the socket K, and bar L, all constructed and arranged to operate substantially as and for the purpose set forth.

2. The rubber-bar M, provided with the rubbers N, in combination with the roller-bar D, provided with the arm J, the socket K, bar L, and lever-arm G, all constructed to operate substantially as set forth.

3. The roller-arm D, provided with the lever-arm G and braces E, having eyes F, in combination with the ratchet H, spring $h$, and cords T U and pulley S, all constructed to operate substantially as and for the purpose set forth.

HENRY M. CRIPPEN.

Witnesses:
J. T. JOHNSTON,
C. E. GARD.